3,112,279
PROCESS FOR THE PREPARATION OF A TRANSITION ALUMINA DEHYDRATION CATALYST
Denis Papée, Paris, and Roland Gauguin, Neuilly-sur-Seine, France, assignors to Pechiney, Compagnie de Produits Chimiques et Electrometallurgiques, Paris, France
No Drawing. Filed Jan. 26, 1959, Ser. No. 788,783
Claims priority, application France Jan. 29, 1958
2 Claims. (Cl. 252—438)

This invention relates to a new type of alumina catalyst and particularly to the new use thereof as a dehydrating catalyst, as well as to a method of its preparation.

It is well known to use certain types of alumina in catalytic dehydration processes of industrial importance such as the dehydration of (a) Ethanol to ethylene;
(b) The preparation of methylamines from methanol and ammonia at temperatures of 340 to 400° C. under pressures of from 1 to 30 kg./cm.$^2$, with the molar ratio of $NH_3:CH_3OH$ ranging from 5 to 50;
(c) The preparation of dimethylamine from aniline and dimethylether at temperatures of 280 to 300° C. or from methanol by dehydration at 200 to 220° C.;
(d) The preparation of acetonitrile from acetic acid and ammonia at temperatures of 375 to 400° C., and other processes involving the elimination of water or ammonia, such as the dehydration of alcohols, or the syntheses of amines and nitriles.

In order to achieve satisfactory yields of the desired products in the above-mentioned dehydration processes it is necessary to operate at relatively low temperatures and thereby to avoid the occurrence of undesirable secondary reactions leading to byproducts which will decrease severely the yield rates of the desired products.

The desirable operation at lower temperature, however, requires catalysts which show sufficient activity to still accelerate the conversion rate satisfactorily at such lowest possible temperature ranges.

Certain alumina gels which have been carefully washed to eliminate impurities resultant from the starting reactants for the preparation of the gels show satisfactory activities, but all these known catalysts suffer from the drawback that their preparation is arduous, complicated, and costly.

The cheaper, industrially produced alumina product of the Bayer process possesses only an extremely weak activity as a dehydration catalyst in the above-listed industrial processes, and is, therefore, unsatisfactory for the purposes of these processes.

The Bayer alumina hydrate consists of crystals having the lattice modification termed alpha trihydrate, $Al(OH)_3$, and this lattice retains in a very strongly bonded manner, sodium compounds which cannot be eliminated even by careful and prolonged washing. In order to activate this Bayer alumina, the same is heated to a conventional activation temperature which is sufficient to destroy the alpha-lattice, so that a transition alumina having a badly defined crystallinity is obtained. The sodium compounds contained in the alpha-trihydrate are thereby converted to hydrolyzable form and can be dissolved in water under formation of sodium hydroxide.

It has been found that the presence of hydrolyzable sodium containing substances in the cheap, industrially produced alumina is closely related to the lack of catalytic activity of the latter. In the past it was therefore always considered necessary to eliminate as much as possible these sodium compounds from the alumina in order to impart the desired catalytic activity to the same.

Among the known processes for producing catalytically active alumina, there are a number of relatively costly processes such as the BASF "precipitation" process and other industrial processes more or less successfully based on the same all of which lead to the formation of $\eta$-alumina. Apart from these well known "precipitation" processes for producing $\eta$-alumina suitable as dehydration catalyst, there is described in U.S. Patent 2,769,688 to Milliken a process for preparing from commercially available Bayer alumina, a certain alumina suitable as a support for hydrogenation-dehydrogenation catalysts.

According to this process, activated or gamma alumina containing about 0.3 to 0.6 percent of sodium by weight, expressed as sodium oxide, is calcined at a temperature in the range of about 700 to 1100° F. for about 2 to 5 hours; then follow leaching for about 2 to 5 hours the resulting cooled calcinate at temperatures between room temperature and 220° F., with a mildly acidic aqueous solution of such vaporizable or heat decomposable weak organic and inorganic acids such as acetic acid, boric acid, formic acid, lastic acid, oxalic acid, or of vaporizable or heat decomposable salts of strong acids and weak bases which on hydrolysis give a mildly acidic reaction, such as aluminum chloride, ammonium nitrate, aluminum nitrate etc.; using the leaching solution in amounts of about 2 to 3 or more times the calcined alumina; and periodically and continuously draining the leaching solution from the leached calcinate; the leached alumina which then contains $Na_2O$ contents of less than 0.1 by weight, may then be washed to free it from residual acid, and/or heated to vaporize or decompose and vaporize the residual acid therefrom. More in particular, the leached alumina may be dried and then calcined in flowing dry air at 1050° F. for 2 hours, the re-calcined alumina may then be dipped in a platinum-containing solution, and dried and then calcined a third time so as to obtain an alumina supported platinum catalyst for hydrogenation-dehydrogenation catalysis.

While the above still relatively complicated Milliken et al. or Houdry process is required to obtain a catalyst support material as described, we have now discovered that a much simpler, shortened procedure somewhat similar to that proposed by Milliken et al. permits to obtain a fully satisfactory dehydration catalyst, although our catalyst could not be a satisfactory support for hydrogenation-dehydrogenation catalysts as prepared by Milliken et al.

The dehydration catalyst according to our invention is distinguished from the Milliken-Houdry catalytic support material by the fact that it is a transition alumina containing above 0.2% by weight and usually about 0.4% of $Na_2O$, wherein the sodium is combined with anions which are stable at the temperatures occurring in the subsequent dehydration catalysis, i.e. temperatures in the order of from about 200 to maximally about 500° C.

It is an important feature of our invention that the alumina useful as a dehydration catalyst may contain such relatively large amounts of sodium as are initially contained in the alumina produced according to the Bayer process. Thereby it is possible to greatly simplify, and reduce the costs of the preparation of this catalyst.

Transition alumina are described, for instance, in "Alumina Properties" by Allen S. Russell et al., Technical Paper No. 10, of Alcoa Research Laboratories, 1956, in particular pages 8, 9, and 28, and by Papée et al. in "Bull. soc. chim." (France), 983–9 (1955), pp. 6, 32, 33, 38, and elsewhere.

The dehydration catalyst according to the invention is prepared from the industrially produced Bayer alumina by the steps of (1) Heating the Bayer alumina trihydrate moderately for 2 to 6 hours to a temperature ranging from about 250 to 500° C., thereby destroying the crystal lattice;

(2) Subsequently adding the trihydrate to a solution of a sodium-binding agent being an acid or salt, the anion of which is capable of forming with the $Na_2O$ values in the alumina, compounds from which the anion is not expelled during the subsequent drying and thereafter the use of the resulting product as a dehydration catalyst at temperatures between 400° to 500° C., in a weight ratio of alumina:solution of sodium-binding agent of about 1:0.4 to 1:2, corresponding substantially to the amount of anion stoichiometrically required for combining with the sodium values, and initimately mixing the alumina and sodium-combining agent by stirring for about one hour or longer at a temperature range of from room temperature up to 100° C., and (3) Separating the resulting solid product from the excess of suspending liquid, if any, preferably be decantation;

(4) Drying the solid product at about 100–200° C.; and (5) Calcinating the same between 300 and 500° C. for two hours in a flowing air atmosphere. The catalyst is then ready for use.

This simple and cheap method of preparing the catalyst according to our invention is particularly advantageous since it does not require any prolonged rinsing and leaching steps which are always connected with considerable difficulties in the case of alumina, especially if the lattice structure of the latter is to be treated gently so as not to be destroyed or recrystallized.

The solution-binding agent can be used in amounts of 1 to 2 liters of its aqueous solution of, for instance, an N/25-concentration per kilogram of alumina. If this ratio is used, the excess of liquid must be removed by filtration or decantation or the like separation before the treated alumina can be dried and reactivated.

We prefer, therefore, to treat the alumina with a more concentrated aqueous solution, for instance of a normality of N/5 to N/10 of sodium-binding agent, so that the volume of the solution required will be maximally 400 ccs. and less per kg. of alumina. In this case the liquid is completely absorbed by the alumina, and no filtration or the like intermediary step is required prior to the calcination of the finished product.

During the above mentioned method of preparing the alumina catalyst, the $Na_2O$ content of the latter remains comprised between, for instance, 0.5 to 0.25 percent by weight. The pH of an aqueous alumina suspension, however, changes from, for instance, about 10 of the Bayer alumina to about 4.5 of the suspended catalyst.

The advantages of the new catalyst and the simple method by which the same can be prepared will be further illustrated by a number of comparative examples, the results of which are tabulated below.

This table shows the results of the dehydration of ethyl alcohol, at different temperatures, stating the yield rate of ethylene based on a flow rate of 1.5 volumes of treated liquid ethyl alcohol per volume of catalyst and per hour, and expressed in percent of moles of ethylene formed per mole of ethyl alcohol passed over the respective catalyst. In another column, there is given the amount of hydrogen contained in the ethylene due to a secondary dehydrogenation reaction, which amount is expressed in percent by volume of ethylene.

The above dehydration process is carried out with different types of catalysts, some being of known types the other prepared by the process according to our invention.

EXAMPLE I

For the sake of comparison, alumina trihydrate obtained by the Bayer process is activated by heating to 500° for 4 hours in a stream of air. 500 g. of the resulting product which has grain sizes in the order of 2 to 5 millimeters, and contains about 0.48% by weight of $Na_2O$, is then used for Dehydration Test No. I listed in the table.

EXAMPLE II 500 g. of the product obtained as described in Example I, are suspended in 4 liters of N/60 hydrochloric acid diluted with water, i.e. HCl is present with an excess of about 10% over the amount of sodium ions present.

The suspension is boiled for about 45 minutes, then washed five times with one liter of water at 80° C., dried at about 200° C., and reactivated by heating to about 500° C. Analysis of the finished catalyst shows a content of 0.05% by weight of Cl and less than 0.1% by weight of $Na_2O$. It corresponds to the catalytic support material for hydrogenation-dehydrogenation catalysts, described by Milliken et al. supra.

The resulting catalyst is used for Test No. II.

EXAMPLE III

An alumina gel is obtained in a conventional manner by precipitating alumina from aluminum nitrate solution by introducing gaseous ammonia, the precipitate is washed several times, dried and activated at 500° C. 500 grams of this catalyst are used in Test No. III.

EXAMPLE IV 500 grams of a dehydration catalyst commercially available under the name of A 10 P manufactured by Badische Anilin- & Sodafabriken, Ludwigshafen, Germany, are used for carrying out Test No. IV.

EXAMPLE V 500 grams of an alumina containing about 0.45% of $Na_2O$ and treated as described in Example I but calcined at only 280° C., are added to 0.8 liter of an aqueous 1/25 molar solution of aluminum nitrate, i.e. an amount of the latter corresponding substantially to sodium ion concentration present in the alumina, and the suspension is stirred for one hour at room temperature, any supernatant fluid is decanted, the product may be rinsed once with one liter of water, again decanted, dried in a furnace at 200° C. and reactivated by calcination at 500° C. The $Na_2O$ content of the final product is 0.41% by weight, the pH of the aqueous suspension has changed from 10 to 4.5. 500 grams of the reactivated catalyst are used for Test No. V.

EXAMPLE VI 500 gram of alumina prepared and pre-treated as described in Example I and having an initial $Na_2O$ content of 0.48%, are dispersed in a rotating vessel provided with a stirrer and then sprayed with 200 ccs. of N/3-sulfuric acid so as to obtain a uniform distribution of the acid over the mass of alumina. The liquid is completely absorbed by the alumina so that no separate liquid phase is left. The mass is stirred for one hour, while the temperature is gradually raised to 100° C. The mixed product is then dried and subsequently calcined for 1 hour at 500° C. The catalyst is then ready for use. No sodium is removed at all during this treatment.

Analysis of the finished catalyst shows the following composition:

| | Percent |
|---|---|
| Transition—$Al_2O_3$ | 97.00 |
| $Na_2O$ | 0.48 |
| $SO_4$ | 0.60 |
| $H_2O$ | 0.92 |
| (and traces of impurities) | |
| | 100.00 |

This catalyst is used in Test No. VI of Table I.

EXAMPLE VII 500 grams of the starting alumina used in the preceding Example VI are added to one liter of an aqueous triammonium phosphate solution containing 4.5 grams of $(NH_4)_3PO_4$, which constitutes an excess of 20% over the amount required for completely neutralizing the Na₂O values present in the starting alumina. The mixture is stirred and heated to 100° C. during one hour. After cooling, the excess liquid is eliminated by filtration and the residue is washed on the filter with one liter of distilled water, added in successive portions, so that the entire filtration step requires only about 2 liters of pure water per kilogram of alumina.

The residue is then dried at 110° C. and calcined for 1 hour at 500° C. while a part of the sodium values has been removed by this treatment, the finished catalyst still contains 0.3% by weight of Na₂O.

A catalyst prepared as described in this example has been used in carrying out Test No. VII of Table I.

EXAMPLE VIII

Example VII is repeated but with 200 ccs. of N/3-hydrochloric acid instead of sulfuric acid, and the mass is stirred for only 30 minutes, while the temperature is gradually raised to 100° C.

The resulting alumina still contains 0.48% of Na₂O. It is used in Test No. VIII of Table I.

*Table I*

CATALYTIC DEHYDRATION OF ETHYL ALCOHOL

| Test No. | Na₂O in percent by weight of the catalyst | Yield rate (percent of C₂H₄ moles per mole of C₂H₅OH) at temperature | | | Content of H₂ in C₂H₄ (volume percent) |
|---|---|---|---|---|---|
| | | 370° C. | 400° C. | 430° C. | |
| I | 0.48 | | | 70 | 3 |
| II | <0.1 | 85 | 97 | 98 | 0.2 |
| III | 0.0 | 94 | 98 | 98 | 0.2 |
| IV | 0.05 | | 90 | 97 | 0.3 |
| V | 0.41 | | 90 | 96 | 0.6 |
| VI | 0.48 | | 90 | 96 | 0.6 |
| VII | 0.3 | 83 | 94 | 97 | 0.3 |
| VIII | 0.48 | 80 | 91 | 96 | 0.3 |

This table clearly shows that the painstaking removal of sodium values from an alumina dehydration catalyst is unnecessary, and that the new alumina catalyst, is fully satisfactory for industrial purposes in spite of its far higher Na₂O content than that of conventionally used catalysts.

EXAMPLE IX

An alumina catalyst prepared as described in Example VI is used for the catalytic production of acetonitrile. A mixture of equimolar parts of acetic acid vapors and ammonia is passed, at a flow rate of 20 moles of the mixture per liter of alumina and per hour over the alumina which is heated to 380° C.

The conversion of the mixture to acetonitrile according to the equation $$CH_3COOH + NH_3 \rightarrow CH_3CN + 2H_2O$$

is practically complete (96%).

It is an important advantage of the new catalyst according to the invention that it has an exceptionally long life time. Even after using the catalyst daily for several months in an industrial dehydration plant, no decrease of catalyst activity is noted. Organic compounds that may tend to become deposited on the catalyst surface, can easily be removed from time to time by heating the catalyst in an air stream to 350 to 400° C.

It will be understood that this invention is susceptible to further modification and, accordingly, it is desired to comprehend such modification within the scope of the appended claims.

What is claimed is:

1. A process for the preparation of a transition alumina dehydration catalyst containing above 0.25% by weight of Na₂O, said process consisting essentially of the steps of (a) calcining a Bayer alumina trihydrate containing 0.3 to 0.6% by weight of Na₂O at about 250–500° C. for two to six hours, thereby destroying the crystal lattice, (b) admixing the resulting calcinate with an aqueous solution of a sodium-binding agent for at least about one hour at from room temperature to 100° C., said sodium-binding agent being selected from the group consisting of: HCl, HNO₃, NH₄Cl, NH₄NO₃, AlCl₃, and Al(NO₃)₃, said solution being present at a weight ratio of about 0.4–2 parts solution to 1 part of alumina, said solution containing sodium-binding agent in an amount corresponding substantially to the amount of anion stoichiometrically required for combining with the sodium values, (c) separating any excess liquid from the sodium-combined alumina solid product from step (b), (d) drying the solid product at about 100–200° C., and (e) calcining the dry solid product at 300–500° C. for two hours in an atmosphere of air, thereby obtaining a dehydration catalyst consisting essentially of an activated transition alumina having an Na₂O content above 0.25% by weight in which the sodium is bound to the anion contained in the aforesaid sodium-binding agent in a form stable at temperatures employed during catalytic dehydration processes which are below 500° C.

2. The process of claim 1, wherein step (b), the weight ratio of solution to alumina is 0.4:1, thereby resulting in complete absorption of the liquid phase in the solid.

References Cited in the file of this patent

UNITED STATES PATENTS

| | | |
|---|---|---|
| 1,909,356 | Jaeger | May 16, 1933 |
| 2,450,766 | Nixon et al. | Oct. 5, 1948 |
| 2,636,902 | Taylor et al. | Apr. 28, 1953 |
| 2,694,674 | Starr et al. | Nov. 16, 1954 |
| 2,723,947 | Oblad | Nov. 15, 1955 |
| 2,769,688 | Milliken | Nov. 6, 1956 |
| 2,800,518 | Pitzer | July 23, 1957 |
| 2,887,455 | Cornelius | May 19, 1959 |